Oct. 30, 1951     E. M. LONG ET AL     2,573,668
LENS CHUCK
Filed Feb. 23, 1949     2 SHEETS—SHEET 1
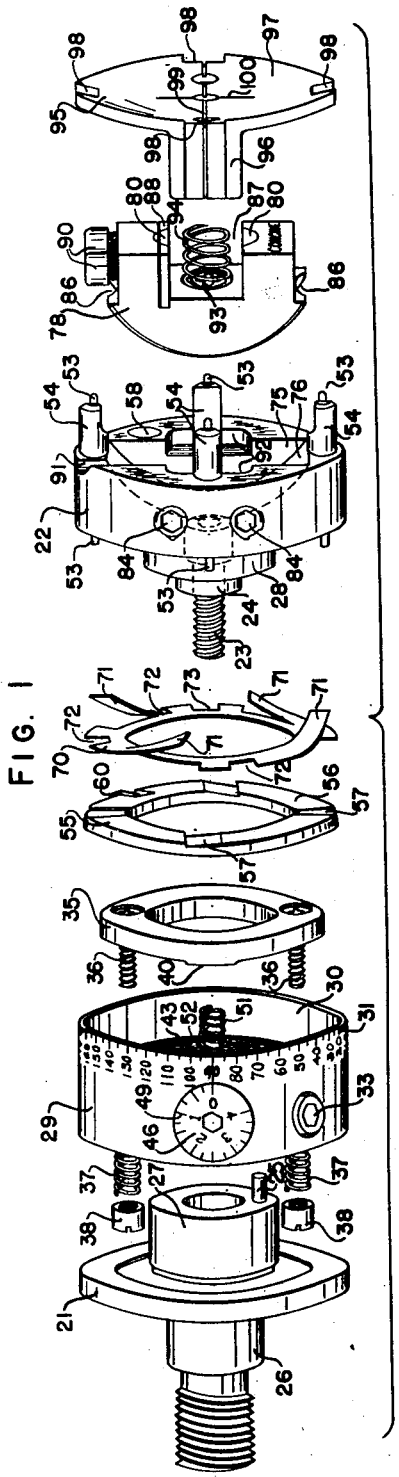
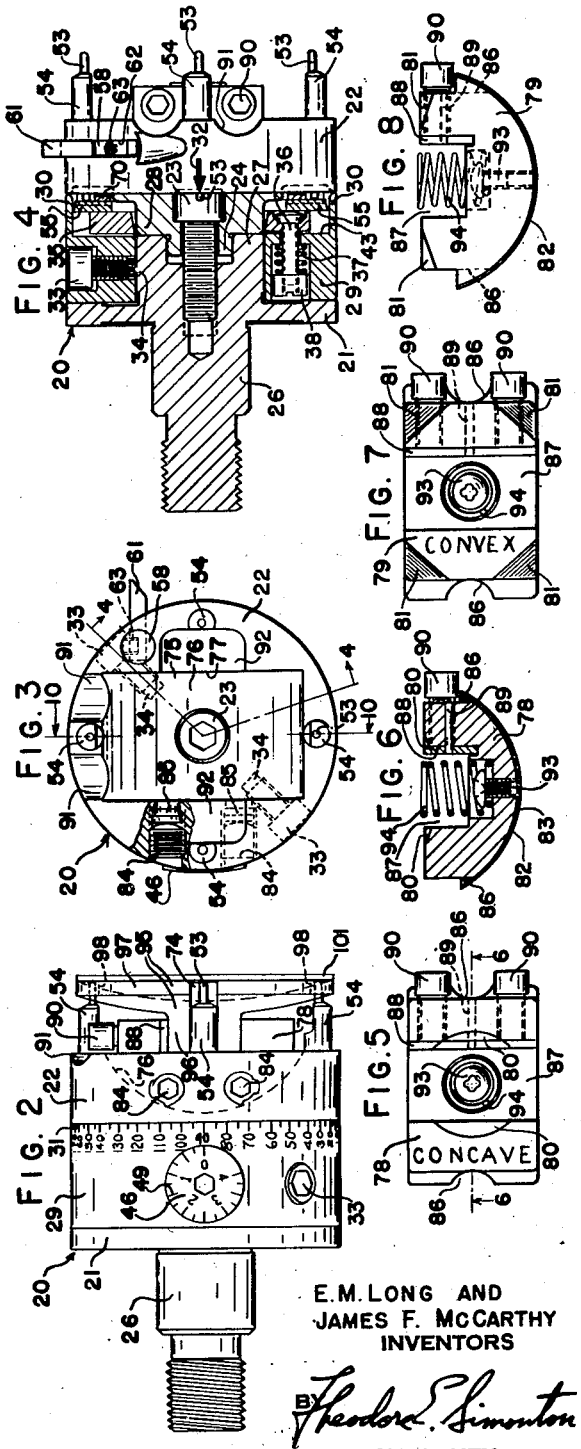
E. M. LONG AND
JAMES F. McCARTHY
INVENTORS
ATTORNEY Oct. 30, 1951 E. M. LONG ET AL 2,573,668
LENS CHUCK
Filed Feb. 23, 1949 2 SHEETS—SHEET 2
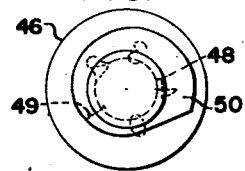
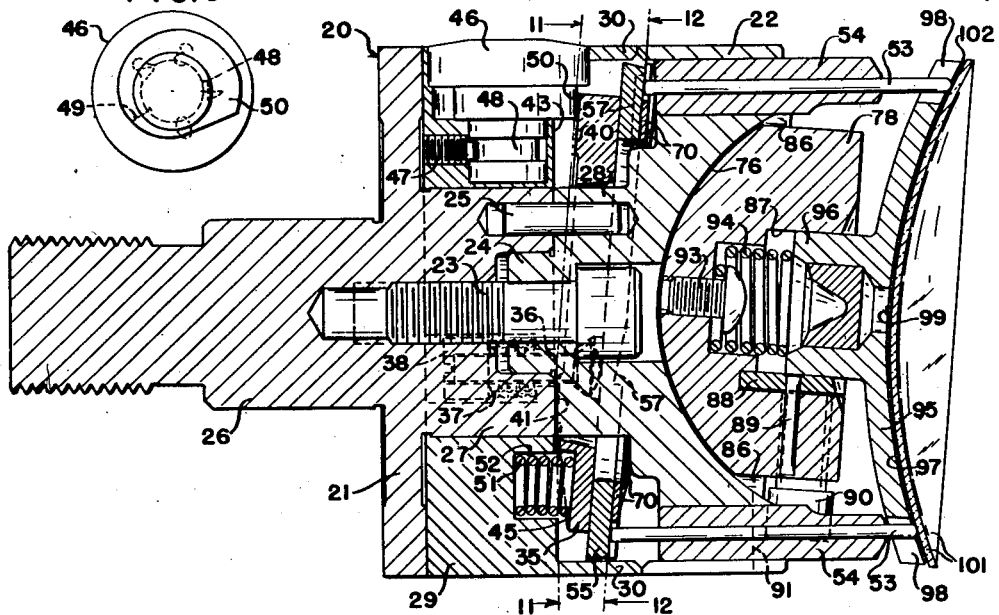
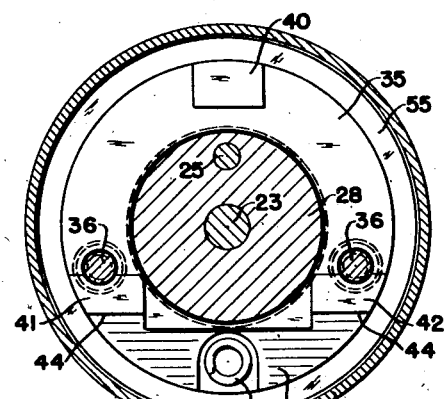
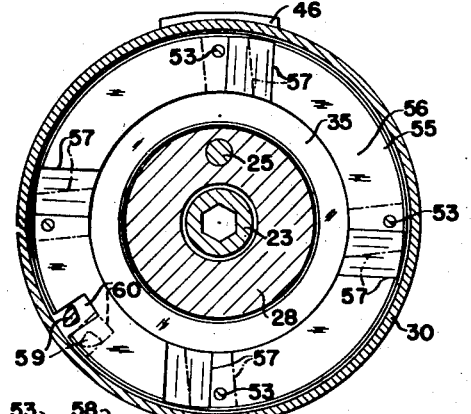
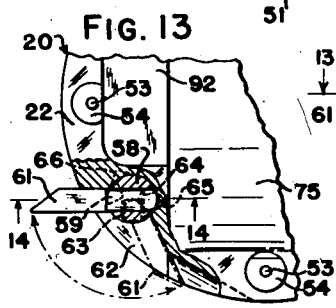
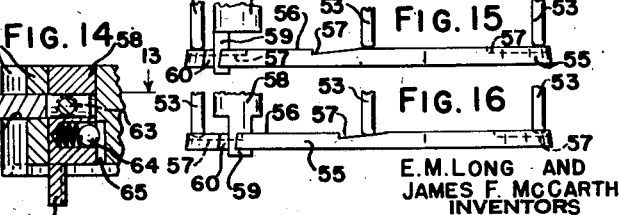
E. M. LONG AND
JAMES F. McCARTHY
INVENTORS
ATTORNEY Patented Oct. 30, 1951

2,573,668

UNITED STATES PATENT OFFICE 2,573,668

LENS CHUCK

Eli M. Long, Geneva, and James F. McCar, Oaks Corners, N. Y., assignors to Shuron Optical Company, Inc., Geneva, N. Y., a corporation of New York Application February 23, 1949, Serial No. 77,888

9 Claims. (Cl. 51—277)

This invention relates to a lens chuck, and more particularly to a chuck for holding a lens block to which has been cemented, as with pitch, a lens blank so that one surface of the blank may be ground or polished by the machine of which the chuck is a part.

In the manufacture of ophthalmic lenses, a lens blank is formed into a finished lens by successively grinding and then polishing, first one surface, and then the other. Usually one surface is concave and the other convex, and the two surfaces have different curvatures, so that the thickness of the lens varies at different points. This variation in thickness gives the optical refraction necessary to provide the desired correction in vision. A lens blank having one of its two surfaces ground and polished is termed a semi-finished lens. The subsequent generation of the opposite surface is a more exacting operation, because the second surface must not only have the correct curvature, but must bear an exact and precise relation to the previously finished surface, in order for the lens to have the ophthalmic properties desired. This precise location of the second surface with respect to the first may require either or both of two adjustments or settings, one called "axis" and the other called "prism." Setting for axis involves a rotation of the second surface with respect to the first, and setting for prism involves a tilting of the second surface with respect to the first.

The problem of correctly relating the second surface to the first, has heretofore usually been taken care of during the so-called blocking operation, in which operation the semi-finished lens blank is secured to the lens block with pitch. It has been the usual practice to block the semi-finished lens with the finished surface precisely positioned with respect to selected surfaces of the lens block. The selected block surfaces are then used to align the lens block in the lens chuck, thus indirectly aligning the lens blank with respect to the chuck. In this method, the relation of the second surface to be generated to the finished surface, is primarily determined during the blocking of the lens blank. It is necessary to use elaborate blocking devices and great care in thus blocking the semi-finished lens blank. Errors in blocking are difficult to avoid, and there is also a decided possibility of error in the relationship between the selected block surfaces and the chuck.

It has heretofore been proposed to avoid certain of the foregoing difficulties by holding the lens block in the chuck in such manner that the position of the lens blank in the chuck is determined not indirectly with reference to selected surfaces of the lens block, but directly by registering pins in the chuck engaging the finished lens surface of the blocked lens blank. The chuck of the present invention belongs to this general type. However, the prior chucks of this character have lacked facilities for adjustment which are provided in our chuck, and have also been subject to the disadvantage that the registering pins remain in firm contact with the finished surface of the lens blank during the grinding of the second surface, which is apt to result in damage both to the finished surface and to the registering pins.

According to the present invention, we provide a chuck adapted to clamp a lens block, and having registering pins whereby the semi-finished lens blank is positioned in the chuck directly with reference to its finished surface, these registering pins being released after chucking so that they are not held in engagement with the blank during the grinding of the second surface. The chuck of this invention also includes mechanisms whereby any desired prism settings within the range usually encountered may be quickly and accurately set in the chuck itself, and need not be determined during the blocking operation. While the semi-finished blank must be precisely centered and the axis of its finished surface must be accurately aligned with respect to the transverse axis of the lens block during the blocking operation, any slight tilting misalignment of the finished surface with respect to the longitudinal axis of the block does not affect the accuracy of the second surface with respect to the first, because the first surface is fixed relative to the chuck by means of the registering pins. Moreover, since the prism settings are made in the chuck itself, the blocking operation is greatly simplified, and greater accuracy of these settings may be readily obtained.

The principal objects of the present invention are to provide a chuck of the registering pin type by means of which a blocked semi-finished lens may be secured in a lens generating machine or the like and positioned with respect thereto so that the finished surface of the lens blank is in the proper relation to the chuck irrespective of any slight tilting misalignment of the blank with respect to the lens block; to provide a chuck in which the registering pins may be released from contact with the lens blank after it has been accurately located and locked in position; and to provide a lens chuck having accurate and easily operated adjustments for prism.

Other objects and advantages of the present invention will be apparent from the following description, taken in conjuction with the accompanying drawings, in which:

Figure 1 is an exploded perspective view of a chuck in accordance with the present invention;

Figure 2 is a side elevation of the assembled chuck, showing mounted therein a lens block carrying a blocked lens blank;

Figure 3 is a front end view thereof, with lens, lens block and lens block rocker removed;

Figure 4 is a top plan view thereof, partly in section on the line 4—4 of Figure 3;

Figure 5 is a front end view of a lens block rocker for concave lenses;

Figure 6 is a section on the line 6—6 of Figure 5;

Figure 7 is a front end view of a lens block rocker for convex lenses;

Figure 8 is a side elevation thereof;

Figure 9 is a bottom plan view of the prism adjusting cam;

Figure 10 is an enlarged sectional view on the line 10—10 of Figure 3, showing the chuck with lens and lens block mounted therein and with prism orienting drum rotated 90° from the position shown in Figures 1, 2 and 3;

Figure 11 is a sectional view taken on the line 11—11 of Figure 10;

Figure 12 is a sectional view taken on the line 12—12 of Figure 10;

Figure 13 is a fragmentary front end view of the chuck, partly in section on the line 13—13 of Figure 14;

Figure 14 is a fragmentary sectional view on the line 14—14 of Figure 13;

Figure 15 is a fragmentary side elevation of the registering pins, the pin table, and pin table rotating stud, showing the pins extended; and Figure 16 is a similar view showing the pins released.

Referring more particularly to the drawings, the chuck 20 comprises an end portion 21 and a body portion 22 secured together by a screw 23. The end 21 and body 22 are held in exact alignment by a boss 24 on the body 22 and a locating pin 25 on the end 21 fitting snugly into mating apertures in the opposing portion. The end 21 is provided with a centering stud 26 having a screw-threaded projection of conventional construction for securing the chuck to the machine of which it is to form a part. The end 21 and body 22 are provided respectively with reduced cylindrical hub portions 27 and 28, preferably of uniform diameter as shown, forming a stationary hub about which parts of the chuck are adapted to rotate.

The prism orienting drum 29 surrounds the hub portions 27 and 28 and is rotatably mounted on the hub portion 27, being recessed at its outer end to accommodate certain interior parts of the chuck, the recessing leaving a rim or flange 30 overlying the hub portion 28 and serving to conceal and protect said interior parts, as illustrated. The end 21, body 22 and drum 29 are all preferably of uniform outside diameter, as shown, so that the chuck as a whole constitutes a cylindrical unit. A scale 31, preferably calibrated in degrees from 0 to 360, is marked on the periphery of the flange 30, and cooperates with a witness mark 32 (Figure 4) on body 22 to indicate the rotation of drum 29 with respect to the body 22. Drum 29 may be locked in any desired position on hub 27 by tightening screws 33, thereby forcing leather friction plugs 34 (Figure 4) against hub 27.

The annular prism tilt table 35 is mounted within the flange 30, and is resiliently secured to the drum 29, by means of the screws 36, springs 37 and nuts 38, in such manner as to rotate with the drum but to be free to tilt with respect to it. The heads of the screws 36 are countersunk in the front face of the table 35, and the springs 37 and nuts 38 are located in countersunk recesses in the back of the drum 29. Table 35 has on its back face three slightly raised pads 40, 41 and 42 (Figures 10 and 11), the exposed surfaces of which are all exactly in the same plane, and the front face of table 35 is plane and exactly parallel to the plane of the pads. The front face 43 of drum 29 is also machined plane, and all three of these planes are normal to the axis of the chuck when the drum 29 and table 35 are in the positions shown in Figure 4. As best shown in Figures 10 and 11, the pad 40 is located at the periphery of table 35, and the pads 41 and 42 have their outer edges lying along a straight line 44 offset from the center of table 35 and normal to a diameter of the table passing through the center of pad 40. The straight line 44 serves as a fulcrum axis bearing on the front face 43 of drum 29 and about which the table 35 may tilt with respect to the drum. In order to prevent interference with this tilting movement, the portion of the back face of table 35 beyond the fulcrum axis 44 is beveled as shown at 45.

The prism adjusting dial member 46 is rotatably mounted in a recess in the side of drum 29, and is held against endwise displacement by a set screw 47 cooperating with a groove 48 in the lower end of the member 46 (Figure 10). The exterior surface of member 46 is provided with a scale 49, preferably graduated in quarter diopters from 0 to 4 diopters, which registers with the 90° mark on scale 31 as index. A cam 50 is formed integrally with the dial member 46, and bears against the pad 40, which serves as the cam follower. As the cam 50 is turned from the zero position illustrated in Figure 2, by inserting a wrench in the hexagonal socket at the center of the scale 49, the pad 40 is forced away from the drum face 43, tilting the table 35 about its fulcrum axis 44, against the pressure of the springs 37, as shown in Figure 10. In order to assure that the pad 40 is maintained at all times in close contact with the cam 50, a coil spring 51 is compressed between drum 29 and table 35 diametrically opposite the cam 50 and pad 40, the spring 51 being contained in a recess 52 located in the front face 43 of the drum, as shown in Figures 1, 10 and 11.

Four registering pins 53 are snugly mounted for free axial sliding movement in bushings 54 secured in holes in the body portion 22, as by a drive fit. The pins 53 are parallel to the axis of the chuck and equidistant therefrom, and are arranged in two diametrically opposed pairs along diameters normal to each other. The bushings 54 project beyond the front face of body 22, and the insides of their outer ends are cut away as shown in order to provide clearance for parts presently to be described.

The inner ends of the pins 53 are adapted to be engaged and operatively positioned by an annular pin table 55, rotatably mounted on the hub 28 of body 22. The rear face of pin table 55 is plane and abuts the corresponding plane face of tilt table 35. The greater portion of the front face 56 of pin table 55 is plane and parallel to its rear face, but the front face 56 is interrupted by four inclined cam surfaces 57 arranged to correspond with the four registering pins 53. The pin table 55 is arranged for reverse rotation between two positions, a pin-holding position in which the inner ends of the pins 53 are opposite flat portions of the front face 56, and a pin-releasing position in which the inner pin ends are opposite the recesses formed by the cam surfaces 57. For thus rotating the pin table 55, there is provided a cylindrical stud 58 (Figures 4, 13 and 14), rotatably mounted in a hole extending longitudinally through the body 22. Projecting from the rear or inner end of stud 58, and preferably formed integrally with it, is an eccentrically located, substantially triangular drive pin 59, which engages in a notch 60 formed in the periphery of pin table 55. A lever 61 is located in a slot 62 in the side wall of body 22, and extends radially into the stud 58, being secured thereto by a set screw 63. The lever 61 serves both to retain the stud 58 in the body 22 and to rotate the stud substantially 120° between its two positions, the ends of the slot 62 serving to limit the movement of lever 61, as shown in Figure 13. When the lever 61 is in the position shown in full lines in that figure, the drive pin 59, pin table 55 and pins 53 are in the pin-holding position illustrated in Figure 15, and when the lever 61 is in the broken line position of Figure 13, the associated parts are in the pin-releasing position of Figure 16. In the latter position, the end of lever 61 is substantially flush with the outer wall of body 22. It will be observed that when the pin table is rotated from the pin-releasing position of Figure 16 to the pin-holding position of Figure 15, the cam surfaces 57 will act to cam the pins outward. The stud 58 is held in either of its two extreme positions by the conventional spring-pressed ball detent 64 countersunk in stud 58 and cooperating with notches 65 and 66 in body 22 (Figures 13 and 14).

The pin table 55 is held resiliently against and parallel with the tilt table 35 by the annular spring member 70 located between table 55 and body 22 (Figures 1 and 10). The spring tension is furnished by compression of the four spring arms 71. Four slots 72 allow the passage of the pins 53. A notch 73, similar to notch 60 in table 55, allows the drive pin 59 to pass through the spring 70, and also provides for the rotation of spring 70 by the drive pin 59 with table 55 in an identical manner.

The outer end of body 22 is provided with a slot 75 having a cylindrical bottom wall 76 and plane side walls 77 exactly parallel to the diameter of the chuck connecting the axes of one pair of the registering pins 53. The slot 75 is adapted to receive either the lens block clamping rocker 78 shown in Figures 1, 5, 6 and 10, and intended for use with concave lens blocks, or the very similar clamping rocker 79 shown in Figures 7 and 8 and intended for use with convex lens blocks. The differences between the rockers 78 and 79 are that rocker 78 has a spherical concave chamfer 80 at the center of its face to provide clearance for concave lens blocks, whereas rocker 79 has a convex spherical chamfer 81 at the four corners of the face of the rocker to accommodate convex lens blocks; and that the rocker 79 is somewhat higher than rocker 78, as will appear from a comparison of Figures 6 and 8. This difference in height enables lens blocks of standard proportions to be used with chuck 20, whereas otherwise a longer shank would be necessary on convex lens blocks for reasons that will be manifest to those familiar with the art. The rockers 78 and 79 being otherwise the same, like reference characters will be applied to their parts, and the following description of rocker 78 will suffice for both.

The rocker 78 has a cylindrical bottom surface 82 mating with the cylindrical bottom wall 76 of slot 75, and has parallel side walls so spaced as to fit snugly within slot 75 for smooth rocking movement therein. The central portion of the cylindrical rocker bottom 82 may be relieved as shown at 83 to lessen the area of contact between the surfaces 76 and 82 and facilitate rocking. The rocker may be clamped in a desired position in slot 75 by tightening the set screws 84, which extend through the side wall of body 22 perpendicular to one of the sidewalls 77 of slot 75. As best shown in Figure 3, steel plugs 85 may be placed between the ends of the set screws 84 and the side of the rocker to protect the latter from the screws. In order to clear the bushings 54 when the rocker is rocked in the slot 75, the ends of the rocker 78 are recessed as shown at 86.

A lens block shank retaining slot 87 extends across rocker 78 centrally of the chuck, with the sides of the slot 87 parallel and exactly perpendicular to the side walls of the rocker. One side of the slot 87 is provided with a plate or gib 88 constituting a movable jaw for clamping the shank of a lens block in slot 87. The gib 88 is held in place by a pin 89, and the gib may be moved to clamping position by tightening the clamping screws 90. In order to provide clearance for the heads of the screws 90, the outer end of body 22 is recessed as shown at 91 (Figures 1, 3 and 4), and it is likewise recessed at each side of the center of slot 75 as shown at 92 (Figures 1 and 3), in order to provide room for the shank of a lens block clamped in rocker 78. Secured in a central recess in the bottom of slot 87 by a screw 93, is a coil spring 94 which is compressed when a block is inserted in the rocker, thereby forcing the rocker to seat firmly against the cylindrical bottom 76. The spring 94 also facilitates removal of a lens block from the rocker when the clamping screws 90 are loosened.

Figures 1, 2 and 10 show a concave lens block 95 differing in some respects from a standard lens block (which differences form no part of the present invention), and which block is particularly suitable for use with the chuck 20. The lens block 95 has the usual rectangular shank 96, of standard dimensions such as to fit in the slot 87 of rocker 78. The face 97 of the block has four substantially square notches 98 arranged around its perimeter at such locations as to be aligned with the registering pins 53 when the block is inserted in the chuck 20, as best shown in Figure 10. The notches 98 thus permit the face 97 to be larger than would otherwise be possible for use with the chuck 20. An axis line 99 is milled across the center of face 97 parallel to the principal axis of shank 96, and is continued down along the ends of the shank, as shown in Figure 1, two of the notches 98 being so located as to permit this. The cross line 100, likewise milled in the face 97, precisely marks the center of the block. The lines 99 and 100 are used in the customary manner when blocking a lens blank to the block 95, to position the center of the blank above the center of the block and to align the axis of the blank with the axis line 99. Figure 10 shows a lens blank 101 cemented to the block 95 by a layer of pitch or like adhesive 102 as the result of such a blocking operation, and it will be understood that the finished surface of the lens blank must be free from pitch within the notches 98 in order that the outer ends of the registering pins 53 may bear directly on that finished surface.

Operation

The operator of the machine to which the chuck 20 is attached, which may be, for example, a toric lens surface generating machine is assumed to be supplied with a semi-finished lens blank properly blocked to a lens block such as the block 95, and with instructions as to the settings of his machine, including the chuck settings. Let us suppose that he is instructed to grind the unfinished blank surface to a particular concave toric surface which does not now concern us, and that he is given a prism power setting of 2 diopters and a base-apex setting of 120°. Where prism settings are required, as in this instance, it is also necessary that the top of the lens blank, which as will be understood by those skilled in this art is remote from the axis line 99, be marked in some convenient manner. The operator first turns the dial member 46 by means of a hexagonal wrench until its scale 49 reads 2 diopters, then loosens the two set screws 33, and turns the drum 29 until its scale 31 reads 120° opposite the witness mark 32 on body 22. He then tightens the screw 33. This completes the prism settings of the chuck, and he is now ready to insert the blocked lens.

The operator next selects the concave rocker 78 and places it in the chuck. He then raises lever 61, thus extending the pins 53 to the correct positions as determined by the chuck settings, the pins being held in those positions by the pin table 55 as above described. He next picks up the blocked lens blank and inserts the block shank 96 in the rocker slot 87 so that the marked top of the lens blank is up, that is, toward the witness mark 32. The operator now gently presses the blank so that its finished back surface just contacts all four of the registering pins 53. Holding the lens blank in this position with one hand, the operator, with his other hand, tightens first the two block clamping screws 90 and then the two rocker clamping screws 84. To make certain that the lens blank is correctly registered against all four pins, it is advisable now to loosen the block clamping screws 90, check the contact between the back of the lens blank and the pins, and again tighten the screws 90. This permits the lens blank to be re-registered despite any side shift or tilt that may have been caused when the rocker clamping screws 90 were first tightened. The lever 61 is then moved to the closed position shown in broken lines in Figure 13, thus releasing the registering pins and permitting them to move back slightly away from the back surface of the chucked lens blank, to avoid injury to them or to the finished blank surface during the subsequent generating operation. The entire chucking operation is now completed, and takes less time to perform than to describe; indeed, a skilled operator can correctly chuck a blocked lens blank in from 15 to 30 seconds.

It will be apparent from the foregoing that a universal tilting action is obtained between the lens blank 101 and the chuck body 22, by virtue of the lens block shank 96 being free to tilt in the rocker slot 87 and the rocker being free to tilt at right angles thereto in the body slot 75. This universal tilting movement enables the rear finished surface of the lens blank 101 to be precisely registered against the outer ends of the pins 53 before the block shank and the rocker are clamped in position as above described.

The pins 53 are made of precisely the same length, so that when the prism power setting of scale 49 is at zero, the outer ends of the pins will define a plane perpendicular to the axis of the chuck, as illustrated in Figures 2 and 4. This is the normal condition of the chuck when the second or outer surface of the lens blank is to be generated without prism. When the prism settings are made as above described, the dial member 46 controls the prism power or amount of tilt about the fulcrum axis 44, and the setting of the drum 29, indicated by the reading of the scale 31, controls the direction of tilt or orientation of the prism with respect to the axis line 99 of the lens block. As will be evident, these prism settings vary the projection of the pins 53 and thus control the alignment of the lens blank to incorporate the desired prism correction therein. When prism is to be incorporated in a lens blank having a finished toric surface, it is merely necessary to block the lens blank with the cylinder axis of its toric surface at a 45° angle to the axis line 99 of the block. This permits the pins 53 to engage the finished toric surface of the lens blank in such manner as to permit all four pins to seat squarely thereon.

If it is considered necessary to caliper the lens during the grinding of the second surface, the blocked lens may be removed from the chuck 20 for calipering, and again clamped in the chuck as above described, without loss of proper registration, it being merely necessary to be certain that the same side of the shank of the lens block is toward the witness mark 32 as before.

The chuck 20 illustrated is proportioned for lens blanks having a diameter of 48 mm. or larger. With a chuck of the proportions illustrated, a suitable length for the pins 53 is $1\tfrac{3}{16}''$, and pins of this length will accommodate lenses from plane to plus or minus 9 diopters power. The pins 53 are freely slidable in the bushings 54, and may easily be removed for cleaning, inspection and replacement if they become bent or otherwise damaged. By substituting pins $1^{19}/_{64}''$ long, a chuck with the proportions illustrated will accommodate lenses from plus or minus 9 to plus or minus 14 diopters power.

In grinding bifocal lens blanks, one of the pins 53 may contact the bifocal segment, in which case, this pin is simply removed and the other three pins relied upon for aligning the semi-finished lens blank in the chuck.

The chuck 20 could of course be used in any type of machine in which it is desired to accurately align a finished surface of a blocked ophthalmic lens or the like. For example, it will be evident that the chuck 20 may be used as well for the generation of spherical surfaces in a spherical lens generating machine, as for the generation of toric surfaces. There are no radially protruding parts, and the whole chuck may be rotated during generation of a spherical second surface on the lens blank without disturbing any of the chuck settings. It will be understood that unfinished lens blanks may be handled in the chuck 20, but in such case, of course, the pins 53 cannot give entirely accurate registration of the unfinished rear surface of the lens blank.

While there is herein described and in the drawings shown an illustrative embodiment of the invention, it is to be understood that the invention is not limited thereto, but may comprehend other constructions, arrangement of parts, details and features without departing from the spirit of the invention. We desire to be limited, therefore, only by the scope of the appended claims.

We claim:

1. A chuck having clamping means capable of being opened for receiving or releasing and closed for holding a lens block to which is secured a lens blank, of the type wherein a finished surface of the blank is aligned with respect to the chuck by a plurality of registering pins contacting said finished surface at their outer ends, and the chuck is thereafter closed to grip the lens block in the position determined by such alignment, characterized by said pins being mounted for axial sliding movement in said chuck, and said chuck comprising manually operable means for selectively engaging the inner ends of all of the pins to limit their axial movement in a rearward direction away from said finished surface during chucking and releasing all of the pins to permit such rearward axial movement after chucking, whereby the pins may engage said finished surface for aligning the lens blank during chucking of the block and may be released while performing operations on the lens blank after chucking of the block is completed.

2. A chuck having clamping means capable of being opened for receiving or releasing and closed for holding a lens block to which is secured a lens blank, of the type wherein a finished surface of the blank is aligned with respect to the chuck by a plurality of registering pins contacting said finished surface at their outer ends, and the chuck is thereafter closed to grip the lens block in the position determined by such alignment, characterized by said pins being mounted for axial sliding movement in said chuck, and said chuck comprising a rotatable table adapted to engage the inner ends of said pins for limiting their axial movement in a rearward direction away from said finished surface when the table is in one position of rotation, said table being provided with recesses adapted to release all of the pins together for restricted rearward movement when the table is in another position of rotation, and manually operable means for selectively rotating said table to either of said two positions, whereby the pins may engage said finished surface for aligning the lens blank during chucking of the block and may be released while performing operations on the lens blank after chucking of the block is completed.

3. A chuck having clamping means capable of being opened for receiving or releasing and closed for holding a lens block to which is secured a lens blank, of the type wherein a finished surface of the blank is aligned with respect to the chuck by a plurality of registering pins contacting said finished surface at their outer ends, and the chuck is thereafter closed to grip the lens block in the position determined by such alignment, characterized by said pins being mounted for axial sliding movement in said chuck, and said chuck comprising a rotatable table adapted to engage the inner ends of said pins, and manually operable means for selectively rotating said table in reverse directions to either of two positions, said table in one of said positions presenting portions to the inner ends of the pins adapted to limit their axial movement in a rearward direction away from said finished surface, and said table in the other of said positions presenting inclined portions to the inner ends of the pins adapted to release the pins for restricted rearward movement, said inclined portions being adapted to cam the pins forward upon rotation of the table back to the first position, whereby the pins may engage said finished surface for aligning the lens blank during chucking of the block and may be released while performing operations on the lens blank after chucking of the block is completed.

4. A chuck having clamping means capable of being opened for receiving or releasing and closed for holding a lens block to which is secured a lens blank, of the type wherein a finished surface of the blank is aligned with respect to the chuck by a plurality of registering pins contacting said finished surface at their outer ends, and the chuck is thereafter closed to grip the lens block in the position determined by such alignment, characterized by said chuck comprising a body portion, universally tiltable clamping means for securing said lens block to said body portion, and said pins being mounted for axial sliding movement in said body portion, and said chuck comprising a table adapted to engage the inner ends of said pins, means for tilting said table to a preselected amount, and means for orienting said tilt in a desired radial direction with respect to the axis of the chuck, whereby said pins may be axially positioned to incorporate a prism correction in the alignment of the lens blank, and manually operable means for locking said clamping means in the tilted position determined by such alignment.

5. A chuck having clamping means capable of being opened for receiving or releasing and closed for holding a lens block to which is secured a lens blank, of the type wherein a finished surface of the blank is aligned with respect to the chuck by a plurality of registering pins contacting said finished surface at their outer ends, and the chuck is thereafter closed to grip the lens block in the position determined by such alignment, characterized by said pins being mounted for axial sliding movement in said chuck, and said chuck comprising a rotatable table adapted to engage the inner ends of said pins, means for selectively rotating said table to either of two positions, said table in one of said positions presenting portions to the inner ends of the pins adapted to limit their axial movement in a rearward direction away from said finished surface during chucking of the block, said table in the other of said positions presenting recessed portions to the inner ends of the pins adapted to release the pins for restricted rearward movement after chucking is completed, means for tilting said table to a preselected amount, and means for orienting said tilt in a desired radial direction with respect to the axis of the chuck, whereby said pins may be axially positioned to incorporate a prism correction in the alignment of the lens blank.

6. A chuck having clamping means capable of being opened for receiving or releasing and closed for holding a lens block to which is secured a lens blank, of the type wherein a finished surface of the lens blank is aligned with respect to the chuck by a plurality of registering pins contacting said finished surface at their outer ends, and the chuck is thereafter closed to grip the lens block in the position determined by such alignment, characterized by said pins being mounted for axial sliding movement in said chuck, and said chuck comprising a body portion, a table mounted for tilting movement about a fulcrum axis offset from the center of the table, cam means for tilting said table to a preselected amount about said fulcrum axis, means for rotating said table, fulcrum axis and cam means with respect to said body portion, and means carried by said table for engaging the inner ends of said pins, whereby said pins may be axially positioned to incorporate a prism correction in the alignment of the lens blank.

7. A chuck having clamping means capable of being opened for receiving or releasing and closed for holding a lens block to which is secured a lens blank, of the type wherein a finished surface of the lens blank is aligned with respect to the chuck by a plurality of registering pins contacting said finished surface at their outer ends, and the chuck is thereafter closed to grip the lens block in the position determined by such alignment, characterized by said pins being mounted for axial sliding movement in said chuck, and said chuck comprising a body portion, a drum rotatable with respect to said body portion, a table tiltably mounted in said drum and rotatable therewith, means for tilting said table to a preselected amount with respect to said drum, means carried by said table for engaging the inner ends of said pins, whereby said pins may be axially positioned to incorporate a prism correction in the alignment of the lens blank, and universally tiltable clamping means for securing said lens block to said body portion, whereby said lens block may be secured to said chuck with said finished surface of the lens blank snugly contacting said pins.

8. A chuck having clamping means capable of being opened for receiving or releasing and closed for holding a lens block to which is secured a lens blank, of the type wherein a finished surface of the blank is aligned with respect to the chuck by a plurality of registering pins contacting said finished surface at their outer ends, and the chuck is thereafter closed to grip the lens block in the position determined by such alignment, characterized by said pins being mounted for axial sliding movement in said chuck, and said chuck comprising a body portion, a drum rotatable with respect to said body portion, a table tiltably mounted in said drum and rotatable therewith, means for tilting said table to a preselected amount with respect to said drum, a second table resiliently held parallel to said first table and rotatable independently thereof, said second table being adapted to engage the inner ends of said pins, means for rotating said second table between pin-holding and pin-releasing positions, recesses in the pin-engaging surface of said second table adapted to register with the inner end of each pin when said second table is rotated to its pin-releasing position, and universally tiltable clamping means for securing said lens block to said body portion, whereby said lens block may be secured to said chuck with said finished surface of the lens blank snugly contacting said pins in their held positions and said pins may be thereafter released from said finished surface.

9. A chuck having clamping means capable of being opened for receiving or releasing and closed for holding a lens block to which is secured a lens blank, of the type wherein a finished surface of the lens blank is aligned with respect to the chuck by a plurality of registering pins contacting said finished surface at their outer ends, and the chuck is thereafter closed to grip the lens block in the position determined by such alignment, said chuck comprising a body portion having a tranverse slot located radially of the axis of the chuck, said slot having a cylindrical bottom surface, a rocker having a mating cylindrical surface tiltably mounted in said slot, a slot in said rocker located normal to said body slot and adapted to tiltably accommodate a portion of said lens block, means for locking said block in said rocker slot in a desired tilted position, and means for locking said rocker in said body slot in a desired tilted position, whereby said lens block may be secured to said chuck with said finished surface of the lens blank snugly contacting said pins.

ELI M. LONG.
JAMES F. McCARTHY.

REFERENCES CITED

The following references are of record in the file of this patent:

UNITED STATES PATENTS

| Number | Name | Date |
|---|---|---|
| Re. 18,569 | McCabe | Aug. 16, 1932 |
| 1,282,037 | Bugbee | Oct. 22, 1918 |
| 1,436,626 | Spaander | Nov. 21, 1922 |
| 2,117,221 | Simpson | May 10, 1938 |
| 2,441,472 | D'Avaucourt | May 11, 1948 |
| 2,465,309 | Happe et al. | May 22, 1949 |